(12) United States Patent
Fujikawa et al.

(10) Patent No.: US 7,618,916 B2
(45) Date of Patent: *Nov. 17, 2009

(54) HYDROTREATING CATALYST FOR GAS OIL, PROCESS FOR PRODUCING THE SAME, AND METHOD OF HYDROTREATING GAS OIL

(75) Inventors: Takashi Fujikawa, Satte (JP); Masahiro Kato, Satte (JP); Nobumasa Nakajima, Satte (JP); Minoru Hashimoto, Satte (JP)

(73) Assignee: Cosmo Oil Co., Ltd., Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 10/539,400

(22) PCT Filed: Dec. 17, 2003

(86) PCT No.: PCT/JP03/16197
§ 371 (c)(1),
(2), (4) Date: Jun. 16, 2005

(87) PCT Pub. No.: WO2004/054712
PCT Pub. Date: Jul. 1, 2004

(65) Prior Publication Data
US 2006/0054536 A1    Mar. 16, 2006

(30) Foreign Application Priority Data
Dec. 18, 2002  (JP) .............................. 2002-366916
Mar. 28, 2003  (JP) .............................. 2003-091844

(51) Int. Cl.
*B01J 27/00*     (2006.01)
*B01J 27/188*    (2006.01)
*B01J 27/19*     (2006.01)
*B01J 27/185*    (2006.01)
*B01J 23/00*     (2006.01)

(52) U.S. Cl. .................. 502/208; 502/210; 502/211; 502/213; 502/313; 502/314; 502/315; 502/316

(58) Field of Classification Search .................. 502/208, 502/210, 211, 213, 313–316
See application file for complete search history.

(56) References Cited

U.S. PATENT DOCUMENTS
5,037,791 A    8/1991  Comolli et al.
(Continued)

FOREIGN PATENT DOCUMENTS
CA    2322362 A1    4/2001
(Continued)

OTHER PUBLICATIONS
Hideki Kobe, et al, "Alumina Tanji Nimo Shokubai Ni Okeru P Tenka Koka No Kaimei", Dai 32 Kai Sekiyu Sekiyu Kagaku Toronikai Koen Yosi, Oct. 11, 2000, pp. 160-161.
(Continued)

*Primary Examiner*—Patricia L Hailey
(74) *Attorney, Agent, or Firm*—Sughrue Mion, PLLC

(57) ABSTRACT

An object of the present invention is to provide a hydrotreating catalyst capable of being produced by a simple method and capable of realizing ultra-deep desulfurization of sulfur components in gas oil without requiring severer operating conditions as well as capable of reducing nitrogen components simultaneously, to provide a process for producing the catalyst, and to provide a process for desulfurizing gas oil using the catalyst.

The invention relates to a catalyst containing on an inorganic oxide support 10 to 40% by weight of a metal in the Group 6 of the periodic table, 1 to 15% by weight of a metal in the Group 8 of the periodic table, 1.5 to 8% by weight of phosphorus, each in terms of an oxide amount based on the catalyst, and 2 to 14% by weight of carbon in terms of an element amount based on the catalyst, wherein the catalyst has a specific surface area of 150 to 300 m$^2$/g, a pore volume of 0.3 to 0.6 ml/g, and an average pore diameter of 65 to 140 Å, and wherein the catalyst has a certain NO adsorption FT-IR spectrum after sulfidation treatment, a process for producing the catalyst, and a process for desulfurizing gas oil using the catalyst.

6 Claims, 2 Drawing Sheets

U.S. PATENT DOCUMENTS

| | | | |
|---|---|---|---|
| 5,232,888 A | | 8/1993 | Kamo |
| 5,397,456 A | * | 3/1995 | Dai et al. .................. 208/108 |
| 5,468,709 A | * | 11/1995 | Yamaguchi et al. ......... 502/210 |
| 5,928,499 A | * | 7/1999 | Sherwood et al. ...... 208/216 PP |
| 6,559,092 B1 | * | 5/2003 | Dufresne et al. ............ 502/180 |
| 2003/0173256 A1 | * | 9/2003 | Fujikawa et al. ............ 208/217 |

FOREIGN PATENT DOCUMENTS

| | | |
|---|---|---|
| EP | 0341893 A2 | 11/1989 |
| EP | 0482817 A1 | 4/1992 |
| EP | 0 496 592 A1 | 7/1992 |
| EP | 1402948 A1 | 3/2004 |
| EP | 1733787 A1 | 12/2006 |
| JP | 06-226108 | 8/1994 |
| JP | 06-339635 A | 12/1994 |
| JP | 2000-313890 A | 11/2000 |
| JP | 2001-062301 A | 3/2001 |
| JP | 2001-62301 A | 3/2001 |
| WO | 01-02092 A1 | 1/2001 |

OTHER PUBLICATIONS

International Search Report dated Apr. 13, 2004.

Nan-Yu Topsøe et al, "Characterizsation of the Structures and Active Sites in Sulfided Co-Mo/$Al_2O_3$ and Ni-Mo/$Al_2O_3$ Catalysts by NO Chemisorption" (1983) Journal of Catalysis, vol. 84, pp. 386-401.

E. Payen et al., "Morphology Study of $MoS_2$- and $WS_2$-Based Hydrotreating Catalysts by High-Resolution Electron Microscopy" (1994) Journal of Catalysis, vol. 147, pp. 123-132.

Chinese Office Action dated Sep. 29, 2006.

Supplementary European Search Report dated May 11, 2009.

* cited by examiner

HYDROTREATING CATALYST FOR GAS OIL, PROCESS FOR PRODUCING THE SAME, AND METHOD OF HYDROTREATING GAS OIL

FIELD OF THE INVENTION

The present invention relates to a catalyst for hydrotreating gas oil, a process for producing the catalyst, and a process for hydrotreating gas oil using the catalyst. More particularly, the invention relates to a catalyst having excellent activity capable of reducing sulfur components and nitrogen components in gas oil to a lower level as compared with cases using this kind of conventional catalysts in hydrotreating gas oil, to a process for producing the catalyst, and to a process for hydrotreating gas oil using this catalyst.

BACKGROUND ART

Recently, a global trend toward stricter quality regulation values for gas oil has emerged to improve atmospheric environments. In particular, a sulfur reduction in gas oil is desirable because sulfur may adversely affect the durability of after-treatment devices expected to provide effective control of diesel emissions, such as oxidation catalysts, nitrogen oxide (NOx) reduction catalysts, and continuous-regeneration type filters for removing particulate matter from diesel exhausts.

Under these circumstances, it has been emphasized to develop an ultra-deep desulfurization technology for removing most of the sulfur components in gas oil substantially. A generally possible technology for reducing the sulfur components in gas oil is to use severer operating conditions for hydrodesulfurization, e.g., reaction temperature and liquid hourly space velocity.

However, use of an elevated reaction temperature results in precipitation of a carbonaceous matter on the catalyst and hence in a rapid decrease in catalytic activity. On the other hand, use of a lowered liquid hourly space velocity results in a reduced purification capacity although desulfurization ability is improved, so that it becomes necessary to enlarge the scale of the facility.

Consequently, the best way of attaining the ultra-deep desulfurization of gas oil without using severer operating conditions is to develop a catalyst having an excellent desulfurization activity.

Recently, many investigations have been made on kinds of active metals, methods of active-metal impregnation, improvements of catalyst supports, regulation of catalyst pore structures, activation methods, and the like, and novel catalysts for deep desulfurization developed have been reported.

For example, Patent Document 1 discloses a process which comprises impregnating an alumina or silica support with a solution which contains an organic compound having a nitrogen-containing ligand as a complexing agent and further contains an active metal, followed by drying at 200° C. or lower.

Patent Document 2 discloses a process which comprises impregnating a γ-alumina support with an impregnating solution obtained by further adding a diol or an ether to an impregnating solution containing a compound of a metal in the Group 8 of the periodic table (hereinafter, sometimes simply referred to as "Group 8 metal"), a compound of a metal in the Group 6 of the periodic table (hereinafter, sometimes simply referred to as "Group 6 metal"), and phosphoric acid, followed by drying at 200° C. or lower.

Patent Document 3 discloses a process which comprises impregnating a support with a solution comprising a compound of a Group 6 metal, a phosphorus component, a compound of a Group 8 metal and citric acid, as in the process of the present invention, followed by burning without drying. Patent Document 4 discloses a process which comprises impregnating a support, on which a compound of a Group 6 metal, a phosphorus component and a compound of a Group 8 metal have been supported, with a solution containing a specific amount of an organic acid, followed by drying at 200° C. or lower.

Furthermore, Patent Document 5 discloses a process which comprises supporting a solution containing a compound of a Group 6 metal, a compound of a Group 8 metal, and phosphoric acid on an oxide support, drying the resulting support at 200° C. or lower to obtain a catalyst, supporting a solution of an organic acid represented by a specific chemical formula on the catalyst, and then drying at 200° C. or lower.

On the other hand, proposals have been made also on a process for catalyst production wherein impregnation is conducted twice with an organic acid.

For example, Patent Document 6 discloses a process which comprises impregnating an oxide support with a solution comprising a compound of a Group 6 metal, a compound of a Group 8 metal, organic acid and phosphoric acid, followed by drying at 200° C. or lower to obtain a catalyst, and further impregnating the catalyst with a solution of an organic acid, followed by drying at 200° C. or lower.

In addition, Patent Document 7 discloses a technique for catalyst production which comprises impregnating an inorganic oxide support with a compound of a Group 8 metal and heteropoly acid of a Group 6 metal, followed by drying.

Moreover, Patent Document 8 discloses a process for catalyst production which comprises impregnating an oxide support with a solution comprising molybdenum, tungsten, a compound of a Group 8 metal, mercaptocarboxylic acid, and phosphoric acid.

This process is mainly intended to form a coordination compound of the mercaptocarboxylic acid with molybdenum, tungsten, and the Group 8 metal compound to highly disperse the coordination compound on the catalyst support.

However, in the process described above, the molybdenum and tungsten is highly dispersed on the support and, hence, it is difficult to form laminated layers of molybdenum disulfide such as catalysts in the present invention which will be described later. It is presumed that the process results in no formation of Type II sites of a CoMoS phase, NiMoS phase, or the like which are especially effective as active sites for desulfurization (i.e., active sites of cobalt or nickel located at the edges of the second and overlying layers of molybdenum disulfide; Type I sites mean the active sites of cobalt or nickel located at the edges of the first layer of molybdenum disulfide, and have activity lower than the Type II sites).

In addition, since the mercaptocarboxylic acid contains sulfur, there is a possibility that when the acid is present around the Group 8 metal (Co or Ni) or forms a coordination compound, then the acid may give not desulfurization-active sites (CoMoS phase, NiMoS phase, or the like) but inactive $Co_9S_8$ or $Ni_3S_2$ species.

Also, the processes for catalyst production described above have drawbacks that some of these necessitate complicated steps and that some of the catalysts obtained are unsuitable for use in the ultra-deep desulfurization of gas oil, some exhibit a low efficiency in the ultra-deep desulfurization range, and some have a short life.

Moreover, Patent Document 9 discloses a catalyst comprising a salt and/or complex of a Group 8 metal selected from cobalt and nickel and a heteropoly acid of a Group 6 metal selected from molybdenum and tungsten on an oxide support, wherein the concentration of the Group 8 metal is about from 2 to 20% by weight based on the support, the concentration of the Group 6 metal is about from 5 to 50% by weight based on the support, and the catalyst substantially contains no free water. Furthermore, Patent Document 10 discloses a catalyst obtained by adding a hydroxycarboxylic acid, in an amount of 0.3 to 5 equivalents to total moles of the metals of a Group 6 metal and a Group 8 metal, to a catalyst in which the Group 6 metal and the Group 8 metal are supported on a support, and subsequently drying at a temperature of 200° C. or lower.

Although various catalysts as results of development have been reported as mentioned above, there is still no proposal of a technology for obtaining a catalyst having a sufficiently high desulfurization activity and a long life, which is capable of being produced by a simple method and also capable of realizing the ultra-deep desulfurization of gas oil without using severer operating conditions.

[Patent Document 1]
JP-A-61-114737

[Patent Document 2]
Japanese Patent No. 2900771

[Patent Document 3]
Japanese Patent No. 2832033

[Patent Document 4]
JP-A-4-156948

[Patent Document 5]
JP-A-4-244238

[Patent Document 6]
JP-A-6-339635

[Patent Document 7]
JP-A-6-31176

[Patent Document 8]
JP-A-1-228552

[Patent Document 9]
JP-A-6-31176

[Patent Document 10]
Japanese Patent No. 3244692

DISCLOSURE OF THE INVENTION

An object of the present invention is to provide a hydrotreating catalyst capable of being produced by a simple method and capable of realizing the ultra-deep desulfurization of sulfur components in gas oil without requiring severer operating conditions as well as capable of reducing nitrogen components simultaneously, and to provide a process for producing the catalyst.

Another object of the present invention is to provide a process for highly efficiently hydrotreating a gas oil fraction using the catalyst.

For achieving the above objects, the present invention provides the following catalyst for hydrotreating gas oil, process for producing the catalyst, and process for hydrotreating gas oil using the catalyst.

(1) A catalyst for hydrotreating gas oil, which comprises on an inorganic oxide support 10 to 40% by weight of at least one selected from metals in the Group 6 of the periodic table, 1 to 15% by weight of at least one selected from metals in the Group 8 of the periodic table, 1.5 to 8% by weight of phosphorus, each in terms of an oxide amount based on the catalyst, and 2 to 14% by weight of carbon in terms of an element amount based on the catalyst, wherein the catalyst has a specific surface area of 150 to 300 $m^2/g$, a pore volume of 0.3 to 0.6 ml/g, and an average pore diameter of 65 to 140 Å, and wherein, when the catalyst is observed on a diffuse-reflectance FT-IR after sulfidation treatment and subsequent NO adsorption, a value of I8 group/(I8 group+I6 group) is within the range of 0.7 to 1 where intensity of NO spectrum (1840 $cm^{-1}$) adsorbed on the metal in the Group 8 of the periodic table is represented by I8 group and intensity of NO spectrum (1700 $cm^{-1}$) adsorbed on the metal in the Group 6 of the periodic table is represented by I6 group.

(2) The catalyst according to the above (1), wherein the catalyst has a pore distribution that a ratio of pores having a pore diameter of the average pore diameter ±15 Å is from 30 to 75%.

(3) The catalyst according to the above (1) or (2), wherein an average number of laminated layers of disulfide of the metal in the Group 6 of the periodic table observed through a transmission electron microscope after presulfidation of the catalyst is from 2.5 to 5.

(4) The catalyst according to the above (1) or (2), wherein an average in-plane-direction length of layers of disulfide of the metal in the Group 6 of the periodic table observed through a transmission electron microscope after presulfidation of the catalyst is from 1 to 3.5 nm.

(5) A process for producing the catalyst of any one of the above (1) to (4), which comprises supporting 10 to 40% by weight of at least one selected from metals in the Group 6 of the periodic table, 1 to 15% by weight of at least one selected from metals in the Group 8 of the periodic table, 1.5 to 8% by weight of phosphorus, each in terms of an oxide amount based on the catalyst, and 2 to 14% by weight of carbon in terms of an element amount based on the catalyst, on an inorganic oxide support having a specific surface area of 230 to 500 $m^2/g$, a pore volume of 0.5 to 1 ml/g, and an average pore diameter of 60 to 120 Å, using a solution comprising the metal in the Group 6 of the periodic table, the metal in the Group 8 of the periodic table, an organic acid, and phosphoric acid, followed by drying at a temperature of 200° C. or lower.

(6) A process for hydrotreating gas oil, which comprises subjecting a gas oil fraction to a catalytic reaction in the presence of the catalyst of any one of the above (1) to (4) under conditions of a hydrogen partial pressure of 3 to 8 MPa, a temperature of 300 to 420° C., and a liquid hourly space velocity of 0.3 to 5 $hr^{-1}$.

BEST MODE FOR CARRYING OUT THE INVENTION

Figure 1:
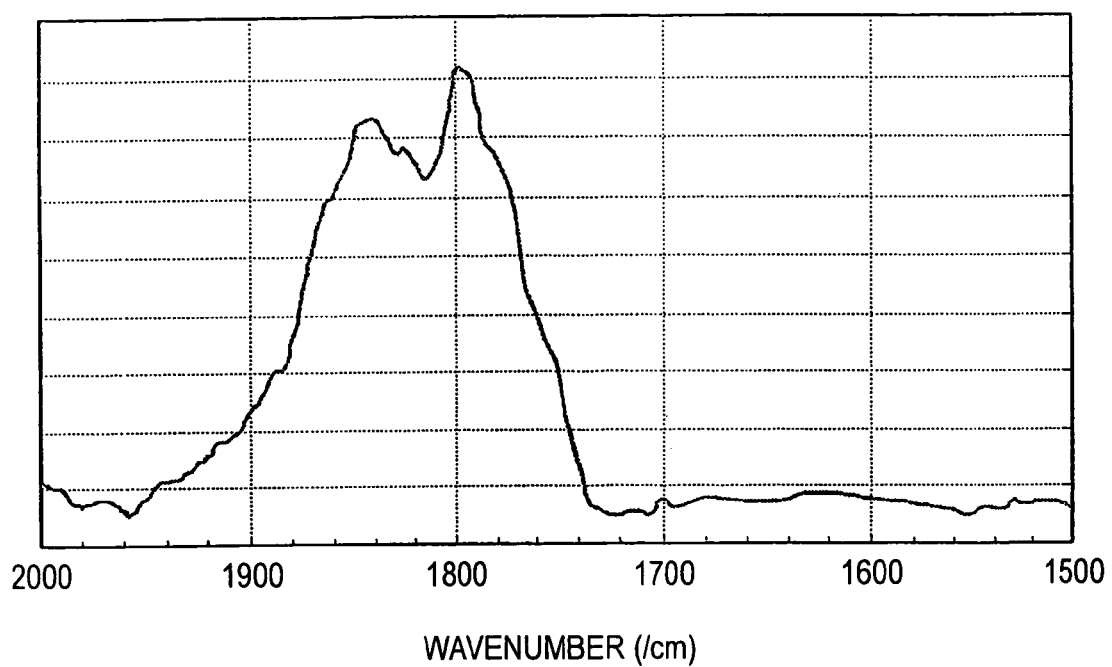
FIG. 1 is a drawing showing an NO adsorption FT-IR spectrum of Catalyst A obtained in Example 1.

As a result of intensive investigations for achieving the above objects, the present inventors have found that when an inorganic oxide support is impregnated with a solution containing a compound of a Group 6 metal, a compound of a Group 8 metal, an organic acid, and phosphoric acid to support these components thereon in given amounts and dried at a temperature of 200° C. or lower, then highly active desulfurization sites (e.g., CoMoS phase Type II sites, NiMoS phase Type II sites, etc.) can be precisely regulated without yielding inactive species of a Group 6 metal, such as cobalt or nickel, and as a result, a high-performance desulfurization catalyst can be obtained which facilitates achievement of an ultra-deep desulfurization reaction without using severer reaction conditions because the desulfurization reaction and a denitrification reaction proceed efficiently.

As the objective oils to be treated in the present invention, gas oil fractions such as straight-run gas oil, catalytically cracked gas oil, thermally cracked gas oil, hydrotreated gas oil, desulfurized gas oil, vacuum distillation gas oil (VGO), and the like are suitable.

Examples of representative properties of such feedstock oils include a boiling point range of 150 to 450° C. and a sulfur content of 5% by weight or lower.

The inorganic oxide support to be used in the catalyst of the present invention may be alumina alone. It is, however, preferred to use a composite oxide containing alumina as the main component in order to further improve desulfurization activity.

As the alumina, use can be made of various aluminas such as α-alumina, β-alumina, γ-alumina, δ-alumina, alumina hydrates, and the like. However, an alumina which is porous and has a large specific surface area is preferred. In particular, γ-alumina is suitable. Aluminas having a purity of about 98% by weight or higher, preferably about 99% by weight or higher, are preferable.

Examples of impurities in aluminas include $SO_4^{2-}$, $Cl^-$, $Fe_2O_3$, $Na_2O$, and the like. The lower the content of these impurities, the more preferable the alumina is. The total content of all impurities is 2% by weight or lower, preferably 1% by weight or lower. The content of each impurity is preferably as follows: $SO_4^{2-}$<1.5% by weight, $Cl^-$, $Fe_2O_3$, $Na_2O$<0.1% by weight.

An oxide component for use in composite formation with an alumina is preferably at least one selected from zeolites, boria, silica and zirconia. The composite formation with these components is advantageous in forming laminated layers of molybdenum disulfide.

Among these components, zeolites have an average particle diameter as determined by the Coulter counter method (1 wt % aqueous NaCl solution; aperture, 30 μm; ultrasonic treatment, 3 minutes) of about 2.5 to 6 μm, preferably about 3 to 5 μm, and more preferably about 3 to 4 μm. In the zeolites, the proportion of particles having a particle diameter of 6 μm or smaller is about from 70 to 98%, preferably about from 75 to 98%, more preferably about from 80 to 98%, based on all zeolites particles.

Such properties of zeolites are advantageous for precisely regulating the pore diameter so that substances which are difficult to desulfurize can easily diffuse in the pores. For example, when a zeolite having too large an average particle diameter or too high a content of coarse particles is used in the preparation of a composite oxide support, the alumina hydrate (alumina precursor) and the zeolite show different degrees of shrinkage during-heating and calcining due to differences in water adsorption and crystallinity between the alumina hydrate (alumina precursor) and the zeolite, whereby a composite oxide support having relatively large pores, i.e., meso- or macropores, tends to form. Moreover, these large pores not only reduce the surface area but also enable metallic components acting as a catalyst poison to readily diffuse in the pores in such a case that the catalyst is used for the treatment of bottoms. As a result, such large pores tend to result in decrease in the catalytic activity on desulfurization, denitrification, and cracking.

Preferred examples of zeolites for use in the composite formation with alumina in the present invention include faujasite X-type zeolite, faujasite Y-type zeolite, β zeolite, mordenite zeolite, ZSM-series zeolites (ZSM-4, 5, 8, 11, 12, 20, 21, 23, 34, 35, 38, 46, etc.), MCM-41, MCM-22, MCM-48, SSZ-33, UTD-1, CIT-5, VPI-5, TS-1, TS-2, and the like. Especially preferred are Y-type zeolite, stabilized Y-type zeolite and β zeolite. Furthermore, proton type zeolites are preferred.

As the above boria, silica and zirconia, use can be made of those generally employed as support components of this kind of catalyst.

The above zeolites, boria, silica and zirconia may be used solely or in combination of two or more thereof.

The amount of the components to be incorporated is not particularly limited. However, the amount of the components in the composite oxide support is generally about from 0.5 to below 20% by weight per about from higher than 80 to 99.5% by weight of the alumina, preferably about from 0.5 to 15% by weight per about from 85 to 99.5% by weight of the alumina, and more preferably about from 0.5 to 10% by weight per about from 90 to 99.5% by weight of the alumina.

Too small or too large amounts of those components result in difficult regulation of pore diameter regulation. In addition, too small amounts thereof result in insufficient impartation of Brønsted acid sites or Lewis acid sites, while too large amounts thereof result in a tendency for Group 6 metals, especially molybdenum, to be difficult to highly disperse.

The inorganic oxide support to be used in the present invention is prepared through calcination at from 580 to 700° C. for from 1.5 to 3 hours.

The catalyst of the invention is prepared by merely drying at 200° C. or lower after active components have been supported on the inorganic oxide support, as will be described later. Accordingly, the mechanical properties of the catalyst (e.g., side crushing strength, compacted bulk density, etc.) which will be described later should be obtained by calcining the inorganic oxide support. When calcination is conducted at a temperature lower than 580° C. for a period shorter than 1.5 hours, sufficient mechanical strength cannot be obtained. Even when calcination is conducted at a high temperature exceeding 700° C. for a prolonged period exceeding about 3 hours, not only the effects of calcination are saturated but also densification may occur to impair properties of the inorganic oxide support, such as specific surface area, pore volume, and average pore diameter.

The specific surface area, pore volume and average pore diameter of the inorganic oxide support should be as follows so that the catalyst has a high activity in the hydrodesulfurization of hydrocarbon oils. The specific surface area of the support is from 230 to 500 m²/g, preferably from 300 to 450 m²/g. The pore volume thereof is from 0.5 to 1 ml/g, preferably from 0.6 to 1 ml/g. The average pore diameter thereof is from 60 to 120 Å, preferably from 65 to 110 Å. The reasons therefor are as follows.

The Group 6 metal and Group 8 metal in the impregnating solution each is thought to be present in the form of a complex (the Group 6 metal has coordinated to phosphoric acid to form a heteropoly acid, while the Group 8 metal has coordinated to the organic acid to form an organometallic complex). Accordingly, when the specific surface area of the support is smaller than 230 m²/g, it is difficult to highly disperse each metal at impregnation because of the bulkiness of the complex. As a result, it would be difficult to precisely regulate the formation of the above active sites (e.g., CoMoS phase, NiMoS phase, etc.) even when the resulting catalyst is subjected to sulfidation treatment.

When the specific surface area of the support is 500 m²/g or smaller, the support has not so exceedingly small pore diameter and hence gives a catalyst which also has not so small pore diameter, so that the case is preferable. When the pore diameter of the catalyst is small, desulfurization activity thereof decreases because the diffusion of sulfur compounds into the catalyst pores is insufficient.

When the pore volume of the support is 0.5 ml/g or more, the amount of the solvent penetrating into the pores is not so small when a catalyst is prepared by the ordinary impregnation method, and hence the case is preferable. Since the solvent amount is small, the compounds of active metals show poor solubility, resulting in impaired metal dispersibility to give a catalyst having poor activity. Although a technique of adding a large amount of an acid, e.g., nitric acid is effective for enhancing the solubility of the compounds of active metals, the technique may result in reduction of the surface area of the support when the acid is added in too large an amount, and this reduction is a major cause of a decrease in desulfurization activity.

When the pore volume of the support is 1 ml/g or smaller, the support has not so small specific surface area and the active metals hence show good dispersibility, resulting in a catalyst having high desulfurization activity.

When the pore diameter of the support is 60 Å or larger, the catalyst on which the active metals are supported has not so small pore diameter and hence the case is preferable. The catalyst having a small pore diameter has reduced desulfurization activity because the diffusion of sulfur compounds into the catalyst pores is insufficient.

When the pore diameter of the support is 120 Å or smaller, the specific surface area of the resulting catalyst is not so small and hence the case is preferable. When the specific surface area of the catalyst is small, the dispersibility of the active metals becomes insufficient and the resulting catalyst has reduced desulfurization activity.

Preferred examples of the Group 6 metal to be contained in the catalyst of the invention include molybdenum and tungsten. Molybdenum is particularly preferable.

The content of the Group 6 metal is from 10 to 40% by weight, preferably from 16 to 35% by weight, in terms of an oxide amount based on the catalyst.

The content of 10% by weight or more is sufficient for producing the effect attributable to the Group 6 metal. When the content is 40% by weight or smaller, aggregation of the Group 6 metal compound does not occur in the step of Group 6 metal impregnation (supporting), resulting in good dispersibility of the Group 6 metal. In addition, enhanced catalytic activity is observed because the content of the Group 6 metal does not exceed the limit for efficient dispersion and the surface area does not considerably decrease, so that the case is preferable.

Preferred examples of the Group 8 metal include cobalt and nickel.

The content of the Group 8 metal is from 1 to 15% by weight, preferably from 3 to 8% by weight, in terms of an oxide amount based on the catalyst.

When the content of the Group 8 metal is 1% by weight or larger, active sites attributable to the Group 8 metal can be sufficiently obtained and hence the case is preferable. When the content is 15% by weight or smaller, aggregation of the Group 8 metal compound does not occur in the step of Group 8 metal impregnation (supporting), resulting in good dispersibility of the Group 8 metal. In addition, it is thought that species of CoO, NiO, etc., which are precursors for species such as $Co_9S_8$ and $Ni_3S_2$, which are inactive metal species of the Group 8 metals such as cobalt and nickel, and further a cobalt spinel, nickel spinel or the like species incorporated in support lattices are not formed. Accordingly, enhanced catalytic activity is observed and hence the case is preferable.

The optimal weight proportion of the Group 8 metal to the Group 6 metal, which are contained in the respective amounts shown above, is preferably about from 0.1 to 0.25 as a value of [the Group 8 metal]/[the Group 8 metal+the Group 6 metal] in terms of an oxide amount.

When the ratio is 0.1 or larger, the formation of a CoMoS phase, NiMoS phase, or the like, which are thought to be active sites for desulfurization, is not inhibited, resulting in a enhanced improvement in desulfurization activity, and hence the case is preferable. When the ratio is 0.25 or smaller, the formation of the above inactive species of cobalt or nickel ($Co_9S_8$ or $Ni_3S_2$) is inhibited, resulting in enhanced catalytic activity, and hence the case is preferable.

The content of phosphorus is from 1.5 to 8% by weight, preferably from 2 to 6% by weight, more preferably from 3 to 6% by weight, in terms of an oxide amount based on the catalyst.

When the content is 1.5% by weight or larger, it is presumed that the Group 6 metal forms a heteropoly acid on the catalyst surface and highly dispersed polylayer $MoS_2$ crystals form in the step of presulfidation, yielding sufficiently the aforementioned active sites for desulfurization, so that the case is preferable. In particular, in order to enable the catalyst to have laminated layers of the Group 6 metal disulfide such as molybdenum disulfide in a number of 2.5 to 5 on the average after the above presulfidation, the content of phosphorus is necessarily regulated to 1.5% by weight or larger.

On the other hand, when the content is 8% by weight or smaller, the Group 6 metal sufficiently forms a heteropoly acid on the catalyst surface and the phosphorus not forming the heteropoly acid disperses on the alumina surface and does not cover the above high-quality active sites for desulfurization during the step of presulfidation, so that the activity is not reduced and hence the case is preferable.

In the content of the phosphorus component, the optimal weight proportion of the active metal, molybdenum to phosphorus is preferably from 0.07 to 0.3, more preferably from 0.09 to 0.25 as a value of $[P_2O_5]/[MoO_3]$.

When the weight proportion of molybdenum to phosphorus is 0.07 or larger as the above ratio, from two reasons that unification of Co and Mo is achieved and laminated layers of molybdenum disulfide can be formed after sulfidation, active sites for desulfurization, CoMoS phase and NiMoS phase, especially Type II sites of CoMoS phase and NiMoS phase which exhibit high desulfurization activity among the active sites for desulfurization are easily obtained and hence a catalyst having high activity is produced, so that the case is preferable.

The weight proportion of 0.3 or smaller is preferable because the activity of the catalyst is not reduced owing to no decrease of surface area and pore volume of the catalyst and the activity deterioration is less apt to occur owing to no increase of acid amount and no invitation of carbon deposition.

The content of carbon is from 2 to 14% by weight, preferably from 2 to 10% by weight, and more preferably from 2 to 4% by weight, based on the catalyst.

The carbon is carbon derived from an organic acid, preferably citric acid. When the content is 2% by weight or larger, the Group 8 metal sufficiently forms a complex compound with the organic acid on the catalyst surface. In this case, it is presumed that the Group 6 metal which is not in the form of a complex in the step of presulfidation is sulfidized prior to the sulfidation of the Group 8 metal in the step of presulfidation, whereby active sites for desulfurization (e.g., a CoMoS phase, NiMoS phase, etc.) are sufficiently formed and hence $Co_9S_8$ or $Ni_3S_2$, which are inactive species of the Group 8 metals such as cobalt and nickel, and a cobalt spinel, nickel spinel or the like species incorporated in support lattices are not formed, so that the case is preferable.

When the content of carbon is 14% by weight or smaller, the Group 8 metal can sufficiently form a complex compound with the organic acid on the catalyst surface. On the other hand, the Group 6 metal does not form a complex compound with the organic acid, and the excess carbon derived from the organic acid does not remain on the catalyst surface, so that the case is preferable.

When the Group 6 metal has formed a complex with the organic acid, the Group 6 metal is sulfidized simultaneously with the sulfidation of the Group 8 metal in the activation (sulfidation). It is presumed that in the sulfidation, active sites for desulfurization (e.g., CoMoS phase, NiMoS phase, etc.) are not efficiently formed and this leads to the formation of $Co_9S_8$ or $Ni_3S_2$, which are inactive species of the Group 8 metals such as cobalt and nickel.

Furthermore, the excess carbon is causative of a decrease in activity because it covers desulfurization-active sites during the stage of sulfidation as a catalyst poison.

In order to enhance activity in the hydrodesulfurization and desulfurization of gas oil, the catalyst of the invention should have the composition described above and further have the following values of a specific surface area, a pore volume and an average pore diameter.

The specific surface area (as determined by the nitrogen adsorption method (BET method)) of the catalyst is about from 150 to 300 m$^2$/g, preferably about from 180 to 280 m$^2$/g.

When the specific surface area is 150 m$^2$/g or larger, the Group 6 metal and Group 8 metal, which each are thought to be present in the form of a complex (the Group 6 metal has coordinated to phosphoric acid to form a heteropoly acid, while the Group 8 metal has coordinated to the organic acid to form an organometallic complex), each is in a sufficiently highly dispersed state on the catalyst surface even when each metal complex is bulky. As a result, it is easy to precisely regulate the formation of the aforementioned active sites through sulfidation, whereby a catalyst having high desulfurization activity is produced. Therefore, the case is preferable.

When the specific surface area is 300 m$^2$/g or smaller, the pore diameter become not remarkably small so that this catalyst has not so small pore diameter, and hence desulfurization activity in hydrotreating is not reduced because the diffusion of sulfur compounds into the catalyst pores is sufficient.

The pore volume of the catalyst as determined by the mercury penetration method is from 0.3 to 0.6 ml/g, preferably from 0.3 to 0.5 ml/g. When the pore volume is 0.3 ml/g or larger, the catalyst has sufficient desulfurization activity in hydrotreating because the diffusion of sulfur compounds in the catalyst pores is sufficient, so that the case is preferable. When the pore volume is 0.6 ml/g or smaller, the catalyst has not exceedingly small specific surface area and dispersibility of the active metals is not lowered. The resulting catalyst hence has high desulfurization activity, so that the case is preferable.

The average pore diameter of the catalyst, as determined from a pore size distribution obtained by the mercury penetration method, is about from 65 to 140 Å, preferably about from 90 to 130 Å, more preferably 96 to 130 Å. When the average pore diameter is 65 Å or larger, reactants are apt to diffuse into the pores and hence desulfurization reactions proceed efficiently, so that the case is preferable. When the average pore diameter is 140 Å or smaller, diffusion into the pores is satisfactory and internal-surface area of the pores is not reduced, so that effective specific surface area of the catalyst do not decrease and the resulting catalyst has an enhanced activity.

In order to increase effective number of pores satisfying the pore requirements described above, the pore diameter distribution of the catalyst, i.e., the proportion of pores having a diameter which is within about ±15 Å based on the average pore diameter is regulated to be 30 to 75%, preferably 35 to 70%, more preferably 40 to 60%. When the proportion is 75% or smaller, the compound to be desulfurized is not limited to specific sulfur compounds and all the sulfur compounds can be desulfurized, so that the case is preferable. On the other hand, when the proportion is 30% or larger, pores not contributing to desulfurization of gas oil do not increase and, as a result, the desulfurization activity does not remarkably decrease.

Moreover, the catalyst of the present invention is preferably one wherein an average number of the laminated layers of the Group 6 metal disulfide such as molybdenum disulfide observed through a transmission electron microscope after a sulfidation treatment is from 2.5 to 5.

Namely, these layers of molybdenum disulfide or the like, which are formed on the inorganic oxide support, not only serve to increase the contact area of the catalyst but also have active sites, e.g., a CoMoS phase, NiMoS phase, or the like, formed therein. However, catalysts wherein the average number of such laminated layers is 2.5 or larger have not so large proportion of lowly active Type I sites of a CoMoS phase, NiMoS phase, or the like and hence have high activity, so that the case is preferable. On the other hand, highly active Type II sites of a CoMoS phase, NiMoS phase, or the like are formed and absolute number of the active sites is not reduced in catalysts wherein the average number is 5 or smaller. Consequently, these catalysts exhibit high activity and hence the case is preferable.

In this regard, as photographs of the transmission electron microscope for the analysis, those capable of visually observing the crystals of the Group 6 metal disulfide such as molybdenum disulfide in the number of 200 or more per field of view are employed.

Furthermore, the in-plane-direction length of disulfide layers of the Group metals such as the molybdenum disulfide, observed through a transmission electron microscope, is suitably from 1 to 3.5 nm, preferably from 2 to 3.5 nm, on the average.

The in-plane-direction length of 1 nm or larger is preferable because the cobalt and nickel can form a square pyramid type pentacoordinate sulfur structure owing to presence of molecules of molybdenum disulfide or the like not only as single molecules and hence a CoMoS phase, NiMoS phase, or the like serving as active sites can be formed. The in-plane-direction length of 3.5 nm or smaller is also preferable because the absolute number of edges is not reduced owing to no increase in size of molybdenum disulfide crystals and hence active sites of a CoMoS phase, NiMoS phase, or the like can be secured in a sufficient number.

In this regard, as photographs of the transmission electron microscope for the analysis, those capable of visually observing the crystals of the Group 6 metal disulfide such as molybdenum disulfide in the number of 200 or more per field of view are employed.

The catalyst of the invention having the properties described above is preferably obtained by the process of the invention which will be explained below.

Namely, the catalyst is preferably obtained by a process which comprises supporting at least one of the aforementioned Group 6 metals, at least one of the aforementioned Group 8 metals, phosphorus, and carbon in the respective amounts shown hereinabove on an inorganic oxide support having the properties described above, using a solution containing a compound containing the Group 6 metal, a compound containing the Group 8 metal, an organic acid, and phosphoric acid, followed by drying. Specifically, for example, the process is accomplished by impregnating the inorganic oxide support with a solution containing the compounds and the like, followed by drying.

Examples of the compound containing a Group 6 metal to be used in the above impregnating solution include molybdenum trioxide, molybdophosphoric acid, ammonium molybdate, molybdic acid, and the like. Molybdenum trioxide and molybdophosphoric acid are preferred.

Such compounds are added to the impregnating solution in such an amount that the resulting catalyst contains the Group 6 metal in an amount within the range shown hereinabove.

Examples of the compound containing a Group 8 metal include cobalt carbonate, nickel carbonate, cobalt citrate compounds, nickel citrate compounds, cobalt nitrate hexahydrate, nickel nitrate hexahydrate, and the like. Cobalt carbonate, nickel carbonate, cobalt citrate compounds, and nickel citrate compounds are preferred. Particularly preferred are cobalt citrate compounds and nickel citrate compounds that have a lower decomposition rate as compared with cobalt carbonate and nickel carbonate.

Namely, when the decomposition rate is high, the cobalt or nickel forms an own layer separately from the disulfide layers of the Group metals such as molybdenum, resulting in insufficient formation of a highly active CoMoS phase, NiMoS phase, or the like. In contrast, when the decomposition rate is low, such a highly active phase can be sufficiently formed at rim-edge parts of the molybdenum disulfide or the like.

Examples of the above cobalt citrate compounds include cobalt (II) citrate ($Co_3(C_6H_5O_7)_2$), cobalt hydrogen citrate ($CoHC_6H_5O_7$), cobalt citrate oxysalt ($Co_3(C_6H_5O_7)_2 \cdot CoO$), and the like. Examples of the nickel citrate compounds include nickelous citrate ($Ni_3(C_6H_5O_7)_2$), nickel hydrogen citrate ($NiHC_6H_5O_7$), nickel (II) citrate oxysalt ($Ni_3(C_6H_5O_7)_2 \cdot NiO$), and the like.

The citrate compounds of cobalt and nickel can be produced in the following manner. In the case of cobalt, the compounds are obtained by dissolving cobalt carbonate in an aqueous solution of citric acid. A citric acid compound obtained by such a method may be used as it is in catalyst preparation without removing the water therefrom.

The Group 8 metal compounds are added to the impregnating solution in such an amount that the resulting catalyst contains the Group 8 metal in an amount within the range shown hereinabove.

Examples of the organic acid include citric acid monohydrate, citric anhydride, isocitric acid, malic acid, tartaric acid, oxalic acid, succinic acid, glutaric acid, adipic acid, benzoic acid, phthalic acid, isophthalic acid, salicylic acid, malonic acid, and the like. Citric acid monohydrate is preferable. It is important to use compounds containing substantially no sulfur as the organic acids.

When citric acid is used as the organic acid, the citric acid may be in the form of citric acid alone or may be in the form of a citric acid compound with a Group 8 metal such as cobalt or nickel as mentioned above.

It is important that the organic acid should be added in such an amount that carbon remains in the content as mentioned above in the resulting catalyst. It is advantageous that the addition amount of the organic acid relative to the Group 8 metal is such that the molar ratio of the organic acid/Group 8 metal is from 0.2 to 1.2, preferably from 0.6 to 1.

The molar ratio of 0.2 or larger is preferable because active sites attributable to the Group 8 metal are sufficiently obtained. When the ratio is 1.2 or smaller, the impregnating solution has not so high viscosity and hence the time for the supporting step does not take much time and the active metals may infiltrate fully into inner parts of the support pellets, so that a well-dispersed state of the active metals is achieved and thus the case is preferable.

Furthermore, it is advantageous that the addition amount of the organic acid relative to the total of the Group 6 metal and the Group 8 metal is such that the molar ratio of the organic acid/[(Group 6 metal)+(Group 8 metal)] is 0.35 or smaller, preferably 0.28 or smaller, more preferably 0.26 or smaller. The molar ratio of 0.35 or smaller is preferable because the excess organic acid which has not formed a complex with the metal does not remain on the catalyst surface. When the organic acid remains on the catalyst surface, the acid may flow out together with a feedstock oil in the sulfidation step.

Examples of the phosphoric acid include various phosphoric acids such as orthophosphoric acid, metaphosphoric acid, pyrophosphoric acid, triphosphoric acid, tetraphosphoric acid, polyphosphoric acid, and the like. Orthophosphoric acid is particularly preferred.

As the phosphoric acid, molybdophosphoric acid may be used, which is a compound with a Group 6 metal. In this case, when the phosphorus content in the resulting catalyst is lower than the lower limit shown hereinabove, phosphoric acid is further added.

When the compound of a Group 6 metal or the compound of a Group 8 metal does not sufficiently dissolve in the impregnating solution, an acid such as nitric acid, an organic acid (e.g., citric acid, malic acid, tartaric acid, etc.) may be used together with the compound. An organic acid is preferably used. When an organic acid is used, there are cases where carbon derived from the organic acid remains in the catalyst obtained. It is therefore important to regulate the carbon content in the catalyst to be within the range shown above.

In the above impregnating solution, the solvent to be used for dissolving the above components is water.

When the amount of the solvent used is too small, the support cannot be sufficiently impregnated. When the amount is too large, a part of the active metals dissolved is not supported on the support and remains adherent to the rim and other parts of the container for the impregnating solution, so that the desired supporting amount cannot be obtained. Consequently, the amount of the solvent is from 50 to 90 g, preferably from 60 to 85 g, per 100 g of the support.

The impregnating solution is prepared by dissolving the respective components mentioned above in the above solvent. At this time, the temperature may be higher than 0° C. to 100° C. or less. So long as the temperature is within this range, the above respective components can be satisfactorily dissolved in the solvent.

The pH of the above impregnating solution is preferably lower than 5. When the pH is less than 5, the amount of hydroxyl ions is not increased and the coordination ability between the organic acid and the Group 8 metal is strengthened and thus formation of a complex of the Group 8 metal is accelerated. As a result, the number of the active sites for desulfurization (CoMoS phase, NiMoS phase, or the like) can be greatly increased and hence the case is preferable.

The inorganic oxide support is impregnated with the impregnating solution thus prepared to thereby deposit the above respective components contained in the solution on the above inorganic oxide support.

The impregnation may be conducted under various conditions. However, in general, the impregnation temperature is preferably higher than 0° C. and lower than 100° C., more preferably from 10 to 50° C., and most preferably from 15 to 30° C. The impregnation period is preferably from 15 minutes to 3 hours, more preferably from 20 minutes to 2 hours, and most preferably from 30 minutes to 1 hour.

When the impregnation temperature is too high, drying may occur during the impregnation, resulting in unevenness of the degree of dispersion. It is preferable to stir the mixture during the impregnation.

After the solution impregnation, the water content is removed to some degree (to LOI (loss on ignition) of about 50% or lower) at a temperature of room temperature to about 80° C. in a nitrogen or air stream or in vacuo. Thereafter, drying is conducted in an air or nitrogen stream or under vacuum at a temperature of 200° C. or lower, preferably from 80 to 200° C. for a period of 10 minutes to 24 hours, more preferably from 100 to 150° C. for a period of 5 to 20 hours.

When the drying is conducted at a temperature of 200° C. or lower, the organic acid, which is thought to be in the form of a complex with a metal, is not released from the catalyst surface. As a result, it is presumed that it is easy to precisely regulate the formation of the above active sites (e.g., CoMoS phase, NiMoS phase, etc.) in sulfidation of the resulting catalyst, and that $Co_9S_8$, $Ni_3S_2$, etc. which are inactive species of cobalt and nickel are not formed and the average number of the laminated layers of the Group 6 metal disulfide such as molybdenum disulfide is from 2.5 to 5. Namely, a catalyst having high desulfurization activity is produced and hence the case is preferable.

However, when the drying is conducted in vacuo, the drying is preferably conducted so as to satisfy the above temperature range in terms of pressure at 760 mmHg. The range of the pressure at the drying is 300 to 900 mmHg, preferably 700 to 850 mmHg, more preferably 730 to 800 mmHg, and most preferably atmospheric pressure.

When the pressure at the drying is 300 mmHg or higher, the boiling point becomes not higher than 200° C. in terms of pressure at 760 mmHg, so that the organic acid which is in the form of a complex with a metal is not easily released. The organic acid, which is thought to be in the form of a complex with a metal, is not released from the catalyst surface and, as a result, it is easy to precisely regulate the formation of the above active sites (e.g., CoMoS phase, NiMoS phase, etc.) in the sulfidation of the resulting catalyst, and $Co_9S_8$, $Ni_3S_2$, etc. which are inactive species of cobalt and nickel are not formed. Namely, a catalyst having high desulfurization activity is produced and hence the case is preferable.

In the invention, the shape of the catalyst is not particularly limited and may be any of various shapes ordinarily employed for this kind of catalyst, e.g., a cylindrical, trilobe, and quadlobe shape. In general, the size of the catalyst is preferably such that the diameter is about from 1 to 2 mm and the length is about from 2 to 5 mm.

The mechanical strength of the catalyst, in terms of side crushing strength (SCS), is preferably about 2 lbs/mm or higher. When the SCS of the catalyst is lower than that value, particles of the catalyst packed into a reactor are destroyed to generate a pressure difference within the reactor, making the continuation of hydrotreating operation impossible.

The compacted bulk density (CBD) of the catalyst is preferably from 0.6 to 1.2 g/ml.

The state of distribution of the active metals in the catalyst is preferably of the uniform type in which the active metals are evenly distributed in the catalyst.

The hydrotreatment process of the invention comprises bringing a gas oil fraction containing sulfur components into contact with the above catalyst under the conditions of a hydrogen partial pressure of 3 to 8 MPa, a temperature of 300 to 420° C., and a liquid hourly space velocity of 0.3 to 5 $hr^{-1}$ to desulfurize the gas oil fraction and thereby diminish the sulfur compounds including sulfur components difficult to remove, which are contained in the gas oil fraction.

The product oil obtained by the process of the present invention can have a sulfur content and a nitrogen content lower than those obtained by hydrotreating techniques of the conventional art.

For practicing the hydrotreatment process of the invention on a commercial scale, hydrotreatment may be conducted by providing a fixed-bed, moving-bed, or fluidized-bed type catalyst layer of the catalyst of the invention in a reactor, introducing a feedstock oil into this reactor, and reacting it under the conditions described above.

In the most common case, a fixed-bed catalyst layer is disposed in a reactor and a feedstock oil is introduced into an upper part of the reactor and passed through the fixed bed from the upper to the lower side thereof. The product oil is discharged from a lower part of the reactor.

The process of the invention may be a single-stage hydrotreatment process in which a feedstock oil is treated in a single reactor packed with the catalyst of the invention, or may be a multistage successive hydrotreatment process in which several reactors packed with the catalyst are used.

Before being used (i.e., prior to the hydrotreatment process of the invention), the catalyst of the invention is activated by sulfidation in the reactor. The sulfidation treatment is conducted using a sulfur compound-containing petroleum distillate and, added thereto, a sulfidizing agent such as dimethyl disulfide or carbon disulfide, or using hydrogen sulfide at a temperature of 200 to 400° C., preferably 250 to 350° C. under a hydrogen atmosphere having a hydrogen partial pressure of ordinary pressure or higher.

Through the sulfidation treatment, the catalyst of the invention forms laminated layers of a Group 6 metal disulfide such as molybdenum disulfide having an average laminated layer number of 2.5 to 5 and an average in-plane-direction length of 1 to 3.5 nm. Also, the catalyst forms highly active sites of a CoMoS phase, NiMoS phase, or the like formed in rim-edge parts of the molybdenum disulfide or the like.

In general, at present, the structure of the active sites widely recognized as active sites of catalysts for desulfurization is a CoMoS phase, NiMoS phase, or the like proposed by TopsΦe et al. (N-. Y. TopsΦe, H. TopsΦe, J. Catal. 84, 386 (1983)). TopsΦe et al. have found that as a result of investigation on the surface of a $CoMo/Al_2O_3$ catalyst by Fourier transform infrared spectroscopy (FT-IR) after sulfidation treatment and adsorption of NO as a probe molecule, the higher the desulfurization activity of the catalyst is, the larger the absorption derived from the Co side and the smaller the absorption derived from the Mo side. They have presumed that such a phenomenon occurs because a CoMoS phase effectively covers the $MoS_2$ edge sites in a catalyst having high desulfurization activity.

When the catalyst of the invention is observed on a diffuse-reflectance FT-IR after sulfidation treatment and subsequent NO adsorption, a value of the I8 group/(I8 group+I6 group) is within the range of 0.7 to 1 wherein intensity of NO spectrum (1840 $cm^{-1}$) adsorbed on the Group 8 metal is represented by I8 group and intensity of NO spectrum (1700 $cm^{-1}$) adsorbed on the Group 6 metal is represented by I6 group.

The value of 0.7 or larger is preferable because the CoMoS phase, NiMoS phase, or the like, which is thought to be active sites for desulfurization, is sufficiently formed and hence enhanced desulfurization activity is attained. As mentioned above, the value is preferably in the range of 0.7 to 1. When the value is 1, a CoMoS phase, NiMoS phase, or the like, which is active sites for desulfurization, is sufficiently formed in rim-edge parts of the molybdenum disulfide or the like and hence high desulfurization activity is observed without showing any peak of intensity of the I6 group metal. The aforementioned characteristic of the catalyst of the invention is an important cause of achieving the desired object of the invention.

EXAMPLES

The following will describe the invention more specifically with reference to Examples and Comparative Examples but the invention is not limited to the following Examples.

Example 1

A powder of zeolite SHY having an $SiO_2/Al_2O_3$ molar ratio of 6 (average particle diameter, 3.5 μm; zeolite particles having a particle diameter of 6 μm or smaller account for 87% of all the particles) was kneaded together with alumina hydrate. The resulting mixture was extrusion-molded and then calcined at 600° C. for 2 hours to obtain a zeolite-alumina composite support in the form of cylindrical moldings having a diameter of 1/16 inch (zeolite/alumina weight ratio, 5/95; pore-volume, 0.79 ml/g; specific surface area, 311 $m^2/g$; average pore diameter, 93 Å).

To 22.3 g of ion-exchanged water were added 10.27 g of cobaltous citrate, and 2.24 g of phosphoric acid (85% aqueous solution), followed by heating to 80° C. and stirring for 10 minutes. Subsequently, 17.61 g of molybdophosphoric acid was added thereto and dissolved, followed by stirring at the same temperature for 15 minutes to prepare a solution for impregnation. At this time, the pH of the impregnating solution was 0.52.

Into an eggplant type flask was introduced 30.0 g of the above zeolite-alumina composite support. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst A.

Example 2

To 24.9 g of ion-exchanged water were added 4.53 g of cobalt carbonate, 12.86 g of molybdenum trioxide, 5.34 g of citric acid monohydrate, and 2.63 g of phosphoric acid (85% aqueous solution), followed by heating to 80° C. and stirring for 30 minutes to prepare a solution for impregnation. At this time, the pH of the impregnating solution was 0.54.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst B.

Example 3

To 22.1 g of ion-exchanged water were added 10.42 g of cobalt (II) citrate and 3.06 g of phosphoric acid (85% aqueous solution), followed by heating to 80° C. and stirring for 10 minutes. Subsequently, 17.89 g of molybdophosphoric acid was added thereto and dissolved, followed by stirring at the same temperature for 15 minutes to prepare a solution for impregnation. At this time, the pH of the impregnating solution was 0.54.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst C.

Example 4

To 21.9 g of ion-exchanged water were added 10.59 g of cobalt (II) citrate, and 3.91 g of phosphoric acid (85% aqueous solution), followed by heating to 80° C. and stirring for 10 minutes. Subsequently, 18.18 g of molybdophosphoric acid was added thereto and dissolved, followed by stirring at the same temperature for 15 minutes to prepare a solution for impregnation. At this time, the pH of the impregnating solution was 0.54.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst D.

Example 5

To 22.3 g of ion-exchanged water were added 8.21 g of cobalt (II) citrate, 2.06 g of nickel citrate, and 2.24 g of phosphoric acid (85% aqueous solution), followed by heating to 80° C. and stirring for 10 minutes. Subsequently, 17.61 g of molybdophosphoric acid was added thereto and dissolved, followed by stirring at the same temperature for 15 minutes to prepare a solution for impregnation. At this time, the pH of the impregnating solution was 0.54.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst E.

Example 6

To 22.7 g of ion-exchanged water were added 8.34 g of cobalt (II) citrate, 2.09 g of nickel citrate, and 3.06 g of phosphoric acid (85% aqueous solution), followed by heating to 80° C. and stirring for 10 minutes. Subsequently, 17.89 g of molybdophosphoric acid was added thereto and dissolved, followed by stirring at the same temperature for 15 minutes to prepare a solution for impregnation. At this time, the pH of the impregnating solution was 0.54.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst F.

Example 7

Alumina hydrate was kneaded and the kneaded one was extrusion-molded and then calcined at 600° C. for 2 hours to obtain a γ-alumina support in the form of cylindrical moldings having a diameter of 1/16 inch (pore volume, 0.85 ml/g; specific surface area, 249 m$^2$/g; average pore diameter, 100 Å).

To 23.7 g of ion-exchanged water were added 10.27 g of cobalt (II) citrate and 2.24 g of phosphoric acid (85% aqueous solution), followed by heating to 80° C. and stirring for 10 minutes. Subsequently, 17.61 g of molybdophosphoric acid was added thereto and dissolved, followed by stirring at the same temperature for 15 minutes to prepare a solution for impregnation. At this time, the pH of the impregnating solution was 0.52.

Into an eggplant type flask was introduced 30.0 g of the above γ-alumina support. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst G.

Example 8

To 25.4 g of ion-exchanged water were added 4.54 g of cobalt carbonate, 17.61 g of molybdophosphoric acid, 3.97 g of malonic acid, and 2.24 g of phosphoric acid (85% aqueous solution), followed by heating to 80° C. and stirring for 30 minutes to prepare a solution for impregnation. At this time, the pH of the impregnating solution was 0.53.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst H.

Example 9

To 25.4 g of ion-exchanged water were added 4.54 g of cobalt carbonate, 17.61 g of molybdophosphoric acid, 5.11 g of DL-malic acid, and 2.24 g of phosphoric acid (85% aqueous solution), followed by heating to 80° C. and stirring for 30 minutes. At this time, the pH of the impregnating solution was 0.56.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst I.

Example 10

To 25.4 g of ion-exchanged water were added 4.54 g of cobalt carbonate, 17.61 g of molybdophosphoric acid, 4.27 g of citric acid, 0.45 g of succinic acid, 0.57 g of tartaric acid, and 2.24 g of phosphoric acid (85% aqueous solution), followed by heating to 80° C. and stirring for 30 minutes. At this time, the pH of the impregnating solution was 0.56.

Into an eggplant type flask was introduced 30.0 g of the same zeolite-alumina composite support as in Example 1. The whole amount of the above impregnating solution was add thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst J.

Example 11

To 22.1 g of ion-exchanged water were added 10.42 g of cobalt (II) citrate and 3.06 g of phosphoric acid (85% aqueous solution), followed by heating to 80° C. and stirring for 10 minutes. Subsequently, 17.89 g of molybdophosphoric acid and 0.50 g of tungsten trioxide were added thereto and dissolved, followed by stirring at the same temperature for 15 minutes to prepare a solution for impregnation. At this time, the pH of the impregnating solution was 0.57.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst K.

Comparative Example 8

A powder of zeolite SHY having an $SiO_2/Al_2O_3$ molar ratio of 6 (average particle diameter, 3.5 μm; zeolite particles having a particle diameter of 6 μm or smaller account for 87% of all the particles) was kneaded together with alumina hydrate. The resulting mixture was extrusion-molded and then calcined at 600° C. for 2 hours to obtain a zeolite-alumina composite support in the form of cylindrical moldings having a diameter of 1/16 inch (zeolite/alumina weight ratio, 7/93; pore volume, 0.69 ml/g; specific surface area, 374 m$^2$/g; average pore diameter, 67 Å).

To 19.8 g of ion-exchanged water were added 7.92 g of cobalt (II) citrate and 3.68 g of phosphoric acid (85% aqueous solution), followed by heating to 80° C. and stirring for 10 minutes. Subsequently, 12.08 g of molybdophosphoric acid was added thereto and dissolved, followed by stirring at the same temperature for 15 minutes to prepare a solution for impregnation. At this time, the pH of the impregnating solution was 0.48.

Into an eggplant type flask was introduced 30.0 g of the above zeolite-alumina composite support. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst L.

Example 13

To 24.6 g of ion-exchanged water were added 5.34 g of cobalt carbonate and 4.29 g of phosphoric acid (85% aqueous solution), followed by heating to 80° C. and stirring for 10 minutes. Subsequently, 15.26 g of molybdenum trioxide was added thereto and dissolved, followed by stirring at the same temperature for 15 minutes to prepare a solution for impregnation. At this time, the pH of the impregnating solution was 0.56.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst M.

Comparative Example 1

In 21.6 g of ion-exchanged water, 3.31 g of cobalt carbonate, 11.41 g of molybdophosphoric acid, and 1.17 g of orthophosphoric acid were dissolved, whereby a solution for impregnation was prepared. Into an eggplant type flask was introduced 30.0 g of a γ-alumina support (pore volume, 0.69 ml/g; specific surface area, 364 m$^2$/g; average pore diameter, 64 Å). The whole amount of the above impregnating solution was added thereto with a pipet and the support was immersed in the solution at about 25° C. for 1 hour.

Thereafter, the support was dried in a nitrogen stream, subsequently dried in a muffle furnace and in an air stream at atmospheric pressure and at 120° C. for about 4 hour, and then calcined at 500° C. for 4 hours to obtain Catalyst a.

Comparative Example 2

To 20.2 g of ion-exchanged water were added 7.45 g of cobalt (II) citrate and 1.17 g of phosphoric acid (85% aqueous solution), followed by heating to 80° C. and stirring for 10 minutes. Subsequently, 11.41 g of molybdophosphoric acid was added thereto and dissolved, followed by stirring at the same temperature for 15 minutes to prepare a solution for impregnation.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream, subsequently dried in a muffle furnace and in an air stream at atmospheric pressure and at 120° C. for about 1 hour, and then calcined at 500° C. for 4 hours to obtain Catalyst b.

Comparative Example 3

To 30.0 g of ion-exchanged water were added 2.61 g of cobalt carbonate, 6.41 g of molybdenum trioxide, 6.14 g of citric acid monohydrate, and 2.77 g of phosphoric acid (85% aqueous solution), followed by heating to 80° C. and stirring for 30 minutes to prepare a solution for impregnation. At this time, the pH of the impregnating solution was 0.82.

Into an eggplant type flask was introduced 30.0 g of a γ-alumina support (pore volume, 0.61 ml/g; specific surface area, 240 m$^2$/g; average pore diameter, 72 Å). The whole amount of the above impregnating solution was added thereto with a pipet and the support was immersed in the solution at about 25° C. for 1 hour.

Thereafter, the support was dried in a nitrogen stream, subsequently dried in a muffle furnace and in an air stream at atmospheric pressure and at 120° C. for about 4 hour, and then calcined at 500° C. for 4 hours to obtain Catalyst c.

Comparative Example 4

To 19.3 g of ion-exchanged water were added 8.28 g of cobalt (II) citrate and 5.76 g of phosphoric acid (85% aqueous solution), followed by heating to 80° C. and stirring for 10 minutes. Subsequently, 12.64 g of molybdophosphoric acid was added thereto and dissolved, followed by stirring at the same temperature for 15 minutes to prepare a solution for impregnation. At this time, the pH of the impregnating solution was 0.46.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst d.

Comparative Example 5

To 22.6 g of ion-exchanged water were added 3.31 g of cobalt carbonate and 1.17 g of phosphoric acid (85% aqueous solution), followed by heating to 80° C. and stirring for 10 minutes. Subsequently, 11.41 g of molybdophosphoric acid was added thereto and dissolved, followed by stirring at the same temperature for 15 minutes to prepare a solution for impregnation. At this time, the pH of the impregnating solution was 0.54.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst e.

Comparative Example 6

To 20.5 g of ion-exchanged water was added 7.27 g of cobalt (II) citrate, followed by heating to 80° C. and stirring for 10 minutes. Subsequently, 11.10 g of molybdophosphoric acid was added thereto and dissolved, followed by stirring at the same temperature for 15 minutes to prepare a solution for impregnation. At this time, the pH of the impregnating solution was 0.78.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst f.

Comparative Example 7

To 25.3 g of ion-exchanged water were added 4.34 g of cobalt carbonate and 12.29 g of molybdophosphoric acid, followed by heating to 80° C. and stirring for 15 minutes to prepare a solution for impregnation. At this time, the pH of the impregnating solution was 1.95.

Into an eggplant type flask was introduced 30.0 g of the same zeolite-alumina composite support as in Example 1. The whole amount of the above impregnating solution was added thereto with a pipet and the support was immersed in the solution at about 25° C. for 3 hours.

Thereafter, the support was dried in a nitrogen stream and then dried in a muffle furnace and in an air stream at atmospheric pressure and at 120° C. for about 16 hours to obtain Catalyst g.

The elemental analysis values and physical properties of the catalysts obtained in Examples and Comparative Examples described above are shown in Table 1.

The methods and analytical instruments used for measuring the physical properties of the catalyst shown in Table 1 are shown below.

[Measurement of Specific Surface Area (SA)]

Specific surface area was measured by the BET method, which is based on nitrogen adsorption.

As a nitrogen adsorption apparatus was used a surface area-measuring apparatus (Belsorp 28) manufactured by Bell Japan Corporation.

[Measurement of Pore Volume (PV), Average Pore Diameter (MPD), etc.]

Pore volume, average pore diameter, and pore size distribution were determined by the mercury penetration method.

As an apparatus for mercury penetration was used a porosimeter (MICROMERITICS AUTO-PORE 9200; manufactured by Shimadzu Corporation).

Measurement was made after the sample was heated at 400° C. for 1 hour under vacuum to remove volatile matters therefrom.

[Measurement of Molybdenum Disulfide Layer (TEM)]

The number of laminated layers of molybdenum disulfide was measured in the following manner using a transmission electron microscope (TEM) (trade name "JEM-2010" manufactured by JEOL Ltd.).

1) A catalyst was packed into a flow-through type reaction tube. The catalyst packed was held at room temperature in a nitrogen stream for 5 minutes, and the surrounding gas was replaced with a mixture of $H_2S$ (5% by volume) and $H_2$. The catalyst was heated at a rate of 5° C./min. After the catalyst temperature reached 400° C., the catalyst was held at the temperature for 1 hour and then cooled to 200° C. in the same atmosphere. Subsequently, the surrounding gas was replaced with nitrogen and the catalyst was cooled to room temperature to complete sulfidation treatment.

2) The catalyst after sulfidation treatment was pulverized in an agate mortar.

3) A small portion of the catalyst pulverized was dispersed in acetone.

4) The resulting suspension was dropped onto a microgrid and dried at room temperature to obtain a sample.

5) The sample was set on the examining part of the TEM and examined at an accelerating voltage of 200 kV. The direct magnification was 200,000 diameters, and five fields of view were examined.

6) Each photograph was enlarged so as to result in a magnification of 2,000,000 diameters (size: 16.8 cm×16.8 cm). The number of the laminated layers of molybdenum disulfide and the in-plane-direction length of the layers were measured using a photograph in which 200 or more of crystals of disulfides of a Group 6 metal such as molybdenum disulfide were visually recognized per field of view.

[Measurement of NO Adsorption FT-IR (Fourier Transform Infrared Spectroscopy) (NO-IR)]

For investigating the amount of gas adsorption onto active metals (Co, Mo, etc.) in a catalyst after pretreatment, NO was adsorbed onto the catalyst after pretreatment and the catalyst was observed on a diffuse-reflectance FT-IR (FT-IR-8100M, manufactured by Shimadzu Corporation). At this time, a heat-vacuum type diffuse-reflectance cell (KBr aperture plate) manufactured by Spectratech Inc. was used.

a) Pretreatment of catalyst (sulfidation treatment): A catalyst was placed in a diffusive reflectance cell after pulverization and heated in an He stream. After the catalyst temperature reached 400° C., the catalyst was held at the temperature for 30 minutes. Then, the surrounding gas was replaced with a mixture of $H_2S$ (5%) and $H_2$ and the catalyst was held at the temperature for 2 hours. Subsequently, the surrounding gas was replaced with He gas and after flashing of 30 minutes the catalyst was cooled to room temperature in the same stream to complete pretreatment.

b) FT-IR measurement: After the catalyst was hold at room temperature for 30 minutes in an NO gas stream, the surrounding gas was replaced with He gas and after evacuation of 30 minutes FT-IR measurement was conducted.

Measuring conditions;

Range of wavelength: 4600 to 400 $cm^{-1}$

Resolution: 4 $cm^{-1}$ c) Analysis of results of measurement: Each of intensity of NO spectrum (1840 $cm^{-1}$) adsorbed on the Group 8 metal and intensity of NO spectrum (1700 $cm^{-1}$) adsorbed on the Group 6 metal was investigated and the number of a CoMoS phase, NiMoS phase, or the like, which is though to be active sites for desulfurization, in edges of the Group 6 metal disulfide such as molybdenum disulfide was compared using the value represented by the following formula:

Active sites of ICoMoS or the like=$I8$ group/($I8$ group+$I6$ group)

wherein I8 group represents intensity of NO spectrum adsorbed on the Group 8 metal and I6 group represents intensity of NO spectrum adsorbed on the Group 6 metal.

As a representative example, an NO adsorption FT-IR spectrum of Catalyst A is shown in FIG. 1.

Figure 2:
FIG. 2 is a photograph showing a transmission electron micrograph of Catalyst B obtained in Example 2.

Also, a transmission electron micrograph (TEM) of Catalyst B is shown in FIG. 2.

TABLE 1

| Catalyst | Chemical composition wt % |||||| P₂O₅/MoO₃ | Physical properties |||| TEM ||| NO-IR I8/(I8 + I6) |
| | CoO | NiO | MoO₃ | WO₃ | P₂O₅ | C | Others including support | | SA m²/g | PV ml/g | MPD Å | MPD ± 15 Å % | Average number of laminated layers | Average inplane-direction length | |
|---|---|---|---|---|---|---|---|---|---|---|---|---|---|---|---|
| A | 5.7 | | 27.0 | | 3.6 | 3.8 | balance | 0.13 | 210 | 0.41 | 111 | 55 | 3.7 | 2.8 | 0.96 |
| B | 5.8 | | 26.9 | | 3.7 | 3.9 | balance | 0.14 | 220 | 0.41 | 112 | 48 | 3.8 | 2.7 | 0.93 |
| C | 5.7 | | 26.8 | | 4.5 | 3.7 | balance | 0.17 | 218 | 0.35 | 106 | 56 | 3.7 | 3.1 | 0.96 |
| D | 5.6 | | 26.5 | | 5.4 | 3.6 | balance | 0.20 | 219 | 0.34 | 106 | 51 | 3.9 | 2.9 | 0.92 |
| E | 4.6 | 1.1 | 26.4 | | 3.6 | 3.9 | balance | 0.14 | 220 | 0.39 | 109 | 49 | 3.8 | 2.8 | 0.97 |
| F | 4.7 | 1.0 | 26.2 | | 4.6 | 3.8 | balance | 0.18 | 215 | 0.39 | 109 | 56 | 3.9 | 2.8 | 0.96 |
| G | 5.6 | | 26.9 | | 3.6 | 3.7 | balance | 0.13 | 197 | 0.39 | 109 | 54 | 3.3 | 3.2 | 0.84 |
| H | 5.4 | | 26.8 | | 3.7 | 2.6 | balance | 0.14 | 205 | 0.40 | 112 | 55 | 3.6 | 2.9 | 0.90 |
| I | 5.4 | | 26.9 | | 3.7 | 3.7 | balance | 0.14 | 217 | 0.38 | 110 | 47 | 3.4 | 3.1 | 0.92 |
| J | 5.7 | | 26.6 | | 4.1 | 3.8 | balance | 0.15 | 223 | 0.40 | 108 | 53 | 3.2 | 2.8 | 0.93 |
| K | 5.5 | | 26.7 | 1.1 | 3.6 | 3.8 | balance | 0.13 | 206 | 0.39 | 113 | 49 | 3.5 | 2.9 | 0.96 |
| L | 5.5 | | 18.9 | | 5.4 | 3.4 | balance | 0.29 | 246 | 0.33 | 71 | 79 | 3.1 | 2.9 | 0.75 |
| M | 6.1 | | 29.0 | | 5.5 | 4.1 | balance | 0.19 | 203 | 0.35 | 107 | 49 | 3.6 | 2.8 | 0.96 |
| a | 5.0 | | 20.0 | | 2.7 | 0 | balance | 0.14 | 250 | 0.48 | 75 | 81 | 1.9 | 3.6 | 0.61 |
| b | 5.4 | | 21.0 | | 2.5 | 0 | balance | 0.12 | 255 | 0.44 | 84 | 79 | 2.2 | 3.5 | — |
| c | 3.8 | | 15.1 | | 4.7 | 4.9 | balance | 0.31 | 165 | 0.32 | 79 | 78 | — | — | 0.56 |
| d | 5.1 | | 19.0 | | 7.6 | 3.5 | balance | 0.40 | 221 | 0.30 | 70 | 77 | 3.1 | 2.9 | 0.63 |
| e | 5.0 | | 20.5 | | 2.4 | 0 | balance | 0.12 | 244 | 0.41 | 82 | 76 | 2.7 | — | 0.52 |
| f | 5.3 | | 21.0 | | 0.9 | 3.2 | balance | 0.04 | 268 | 0.42 | 72 | 79 | 1.9 | — | — |
| g | 5.6 | | 26.7 | | 1.0 | 0 | balance | 0.04 | 218 | 0.40 | 109 | 51 | 2.1 | 3.1 | — |

[Hydrotreating Reaction of Straight-Run Gas Oil]

Using catalysts A to M and a to g prepared in the above Examples and Comparative Examples, a straight-run gas oil having the properties shown below was hydrotreated according to the following procedure.

First, the catalyst was packed into a high-pressure flow-through type reactor to form a fixed-bed catalyst layer, which was pretreated under the following conditions.

Subsequently, a fluid mixture of the feedstock oil and a hydrogen-containing gas which had been heated to the reaction temperature was introduced through an upper part of the reactor to allow a hydrotreating reaction to proceed under the following conditions. A fluid mixture of a product oil and gases was discharged through a lower part of the reactor, and the product oil was separated with a gas/liquid separator.

Pretreatment: Each Catalyst was Subjected to Liquid Sulfidation with the Feedstock Oil.

Pressure (hydrogen partial pressure): 4.9 Mpa
Atmosphere: Hydrogen and the feedstock oil (liquid hourly space velocity, 1.5 hr$^{-1}$; hydrogen/oil ratio, 200 m³ (normal)/kl)
Temperature: Introduction of hydrogen and the feedstock oil at about 22° C., elevation at a rate of 20° C./hr, holding at 300° C. for 24 hr, and subsequent elevation to the reaction temperature, i.e., 350° C., at a rate of 20° C./hr Hydrotreating Reaction Conditions:
Reaction temperature: 350° C.
Pressure (hydrogen partial pressure): 4.9 Mpa
Liquid hourly space velocity: 1.5 hr$^{-1}$
Hydrogen/oil ratio: 200 m³ (normal)/kl Properties of Feedstock Oil:
Kind of oil: straight-run gas oil from Middle East
Density (15/4° C.): 0.8570
Distillation characteristics: Initial distillation point of 212.5° C., 50% point of 303.5° C., 90% point of 354.0° C., end point of 372.5° C.
Sulfur content: 1.61% by weight
Nitrogen content: 140 ppm by weight
Dynamic viscosity (@30° C.): 5.857 cSt
Pour point: −2.5° C.
Cloud point: 1.0° C.
Cetane index: 54.5
Saybolt color: −6

The results of the reaction were analyzed by the following method.

The reactor was operated at 350° C. Six days thereafter, the product oil was sampled and properties thereof were analyzed. Degree of desulfurization, desulfurization reaction rate constant, and specific activity were calculated as follows. The results thereof are shown in Table 2.

[1] Degree of Desulfurization (HDS) (%)

The proportion of sulfur components which have disappeared from the feedstock oil through conversion to hydrogen sulfide by desulfurization reaction is defined as a degree of desulfurization. The degree of desulfurization was calculated from the analytical values of sulfur content in the feedstock oil and product oil in accordance with the following equation:

$$\text{Degree of desulfurization (\%)} = [(Sf-Sp)/Sf] \times 100$$

[2] Desulfurization Reaction Rate Constant (Ks):

The rate constant of a reaction rate equation which gives the 1.3 order of reaction with respect to decrease in the sulfur content of the product oil (Sp) is determined as a desulfurization reaction rate constant (Ks). Also, the higher the reaction rate constant is, the more excellent the catalytic activity is.

$$\text{Desulfurization reaction rate constant} = [1/(Sp)^{(1.3-1)} - 1/(Sf)^{(1.3-1)}] \times (LHSV) \times 1/(1.3-1)$$

In the above formulae as for degree of desulfurization and desulfurization reaction rate constant, Sf represents sulfur content in feedstock oil (% by weight), Sp represents sulfur content in product oil (% by weight), and LHSV represents liquid hourly space velocity (hr$^{-1}$)

[3] Specific Activity (%):

Specific activity (%)=((each desulfurization reaction rate constant)/(desulfurization reaction rate constant of Comparative Catalyst a))×100

TABLE 2

| | Reaction temperature 350° C. | | | | |
|---|---|---|---|---|---|
| Catalyst | Sulfur content (ppm by weight) | Degree of desulfurization (%) | Rate constant | Specific activity | Nitrogen content (ppm by weight) |
| A | 9 | 99.9 | 36.7 | 270 | <1 |
| B | 8 | 100 | 38.1 | 280 | <1 |
| C | 8 | 100 | 38.1 | 280 | <1 |
| D | 10 | 99.9 | 35.4 | 261 | <1 |
| E | 8 | 100 | 38.1 | 280 | <1 |
| F | 8 | 100 | 38.1 | 280 | <1 |
| G | 13 | 99.9 | 32.4 | 238 | <1 |
| H | 10 | 99.9 | 35.4 | 261 | <1 |
| I | 13 | 99.9 | 32.4 | 238 | <1 |
| J | 12 | 99.9 | 33.3 | 245 | <1 |
| K | 10 | 99.9 | 35.4 | 261 | <1 |
| L | 48 | 99.7 | 20.5 | 151 | 3 |
| M | 9 | 99.9 | 36.7 | 270 | <1 |
| a | 142 | 99.1 | 13.6 | 100 | 41 |
| b | 88 | 99.5 | 16.3 | 121 | 27 |
| c | 170 | 98.9 | 12.6 | 93 | 50 |
| d | 120 | 99.3 | 14.5 | 107 | 3 |
| e | 179 | 98.9 | 12.4 | 91 | 38 |
| f | 126 | 99.2 | 14.2 | 105 | 6 |
| g | 214 | 97.5 | 11.3 | 83 | 40 |

As is apparent from Table 2, it is understood that an ultra-deep desulfurization region can be easily attained using Catalysts A to M according to the process of the invention.

Also, as is apparent from the results given above, it is understood that the catalysts according to the invention has highly excellent activity in the desulfurization reaction and denitrification reaction of gas oil in the ultra-deep desulfurization region under about the same conditions, e.g., hydrogen partial pressure and reaction temperature, as in the case of conventional hydrotreating processes of gas oil.

While the invention has been described in detail and with reference to specific examples thereof, it will be apparent to one skilled in the art that various changes and modifications can be made therein without departing from the spirit and scope thereof.

The present application is based on Japanese Patent Application No. 2002-366916 filed on Dec. 18, 2002 and Japanese Patent Application No. 2003-091844 filed on Mar. 28, 2003, and the contents are incorporated herein by reference.

The present application is a patent application relating to results of contract research sponsored by Japanese Government (Contract research of 2002 from New Energy and Industrial Technology Development Organization (technology development of reduction of oil refinery contaminant and the like), Article 30 of the Special Measure Law for Industrial Vitality Regeneration is applied thereto).

INDUSTRIAL APPLICABILITY

According to the invention, the following effects can be exhibited.

(1) The catalyst has high desulfurization and denitrification activity and hence is capable of greatly reducing the sulfur and nitrogen contents in gas oil.

(2) Almost the same reaction conditions as in conventional hydrotreating processes can be employed. Accordingly, conventional apparatus can be used without necessitating a considerable modification.

(3) A gas oil base having reduced sulfur and nitrogen contents can be easily supplied.

The invention claimed is:

1. A catalyst for hydrotreating gas oil, which comprises on an inorganic oxide support 10 to 40% by weight of at least one metal selected from metals in the Group 6 of the periodic table, 1 to 15% by weight of at least one metal selected from metals in the Group 8 of the periodic table, 1.5 to 8% by weight of phosphorus, each in terms of an oxide amount based on the catalyst, an organic acid at from 2 to 14 wt% as an amount of carbon derived from the organic acid based on the catalyst, and wherein the organic acid is contained in an amount of from 0.2 to 1.2 moles relative to 1 mole of the metal of Group 8 of the periodic table, and wherein the catalyst has a specific surface area of 150 to 300 m$^2$/g, a pore volume of 0.3 to 0.6 ml/g, and an average pore diameter of 96 to 140 Å, and wherein, when the catalyst is observed on a diffuse-reflectance FT-IR after sulfidation treatment and subsequent NO adsorption, a value of I8 group/(I8 group+I6 group) is within the range of 0.7 to 1 wherein intensity of NO spectrum (1840 cm$^{-1}$) adsorbed on the metal in the Group 8 of the periodic table is represented by I8 group and intensity of NO spectrum (1700 cm$^{-1}$) adsorbed on the metal in the Group 6 of the periodic table is represented by I6 group.

2. The catalyst according to claim 1, wherein the catalyst has a pore distribution that a ratio of pores having a pore diameter of the average pore diameter±15 Å is from 30 to 75%.

3. The catalyst according to claim 1 or 2, wherein an average number of laminated layers of disulfide of the metal in the Group 6 of the periodic table observed through a transmission electron microscope after presulfidation of the catalyst is from 2.5 to 5.

4. The catalyst according to claim 1 or 2, wherein an average in-plane-direction length of layers of disulfide of the metal in the Group 6 of the periodic table observed through a transmission electron microscope after presulfidation of the catalyst is from 1 to 3.5 nm.

5. A process for producing the catalyst of any one of claims 1 or 2, which comprises supporting 10 to 40% by weight of at least one metal selected from metals in the Group 6 of the periodic table, 1 to 15% by weight of at least one metal selected from metals in the Group 8 of the periodic table, 1.5 to 8% by weight of phosphorus, each in terms of an oxide amount based on the catalyst, and an organic acid at from 2 to 14 wt % as an amount of carbon derived from the organic acid based on the catalyst and in such a manner that a molar ratio of organic acid/Group 8 metal of the periodic table is from 0.2 to 1.2 on an inorganic oxide support having a specific surface area of 230 to 500 m$^2$/g, a pore volume of 0.5 to 1 ml/g, and an average pore diameter of 96 to 120 Å, using a solution comprising the metal in the Group 6 of the periodic table, the metal in the Group 8 of the periodic table, the organic acid, and phosphoric acid, followed by drying at a temperature of 200° C. or lower.

6. A process for hydrotreating gas oil, which comprises subjecting a gas oil fraction to a catalytic reaction in the presence of the catalyst of any one of claims 1 or 2 under conditions of a hydrogen partial pressure of 3 to 8 MPa, a temperature of 300 to 420° C., and a liquid hourly space velocity of 0.3 to 5 $hr^{-1}$.

* * * * *